(12) United States Patent
Jäckle

(10) Patent No.: US 9,529,368 B2
(45) Date of Patent: Dec. 27, 2016

(54) PRESSURE-REDUCING VALVE

(71) Applicant: Georg Fischer Rohrleitungssysteme AG, Schaffhausen (CH)

(72) Inventor: Timo Jäckle, Hilzingen (DE)

(73) Assignee: Georg Fischer Rohrleitungssysteme AG (CH)

( * ) Notice: Subject to any disclaimer, the term of this patent is extended or adjusted under 35 U.S.C. 154(b) by 137 days.

(21) Appl. No.: 14/467,373

(22) Filed: Aug. 25, 2014

(65) Prior Publication Data
US 2015/0059883 A1 Mar. 5, 2015

(30) Foreign Application Priority Data
Aug. 27, 2013 (EP) .................................. 13004212

(51) Int. Cl.
*G05D 16/06* (2006.01)
*F16K 15/02* (2006.01)
*F16K 15/14* (2006.01)

(52) U.S. Cl.
CPC ......... *G05D 16/0655* (2013.01); *F16K 15/026* (2013.01); *F16K 15/144* (2013.01); *G05D 16/063* (2013.01); *Y10T 137/7923* (2015.04); *Y10T 137/7929* (2015.04); *Y10T 137/7932* (2015.04)

(58) Field of Classification Search
CPC . G05D 16/063; G05D 16/0655; F16K 15/026; F16K 15/144; Y10T 137/7923; Y10T 137/7929; Y10T 137/7932; Y10T 137/7934
USPC ............... 137/505.29, 536, 540, 542, 543.13
See application file for complete search history.

(56) References Cited

U.S. PATENT DOCUMENTS

| | | | | |
|---|---|---|---|---|
| 1,585,479 A * | 5/1926 | Fisher | ................ | G05D 16/0655 236/26 R |
| 1,945,834 A * | 2/1934 | Terry | ................. | G05D 16/0663 137/454.5 |
| 3,902,522 A | 9/1975 | Karenfeld | | |

(Continued)

FOREIGN PATENT DOCUMENTS

| | | | | |
|---|---|---|---|---|
| DE | 3637777 A1 * | 5/1988 | ......... | G05D 16/0638 |
| DE | 4024487 A1 | 2/1992 | | |

(Continued)

*Primary Examiner* — Mary McManmon
*Assistant Examiner* — Richard K Durden
(74) *Attorney, Agent, or Firm* — Harness, Dickey & Pierce, P.L.C.

(57) ABSTRACT

A pressure-reducing valve for fluid and gaseous media, more particularly for regulating the pressure in pipeline systems, preferably in buildings, containing a housing preferably consisting of at least one upper and lower part, an interior housing wherein the interior housing has a poppet bore, a diaphragm for dividing the housing into a fluid-free and fluid-flowing area, a pressure adjustment unit, wherein the pressure adjustment unit comprises a spindle, a spring valve, a spring holder and at least one spring, a fastening means and a poppet, wherein the poppet and the diaphragm are connected to one another by fastening means, wherein the poppet is disposed in the poppet bore and at least one sealing element is arranged between the poppet and poppet bore for sealing action, wherein the poppet is formed in one piece and the sealing element is disposed integrally on the poppet or integrally on the interior housing.

13 Claims, 3 Drawing Sheets

(56) References Cited

U.S. PATENT DOCUMENTS

| | | | | |
|---|---|---|---|---|
| 6,062,245 A | * | 5/2000 | Berglind | ............ G05D 16/0655 137/12 |
| 2007/0251588 A1 | * | 11/2007 | Linder | ...................... F16K 1/48 137/625.5 |

FOREIGN PATENT DOCUMENTS

| | | |
|---|---|---|
| EP | 2211247 A2 | 7/2010 |
| FR | 2632045 A1 | 12/1989 |
| GB | 2071277 A | 9/1981 |
| JP | 2002-157021 A | 5/2002 |

\* cited by examiner

PRESSURE-REDUCING VALVE

CROSS-REFERENCE TO RELATED APPLICATIONS

This application claims the benefit and priority of European Patent Application No. 13004212.0 filed on Aug. 27, 2013. The entire disclosure of the above application is incorporated herein by reference.

BACKGROUND

This section provides background information related to the present disclosure which is not necessarily prior art.

1. Technical Field

The invention relates to a pressure-reducing valve for fluid and gaseous media, more particularly for regulating the pressure in pipeline systems, advantageously in buildings, containing a housing, preferably comprising an upper and lower part, an interior housing, wherein the interior housing has a poppet bore, a diaphragm for dividing the housing into a fluid-free and a fluid-flowing area, a pressure adjustment unit, wherein the pressure adjustment unit comprises a spindle, a spring plate, a spring holder and at least one spring, a fastening means and a poppet, wherein the poppet and the diaphragm are connected to one another by means of fastening means, wherein the poppet is arranged in the poppet bore and at least one sealing element is arranged between the poppet and poppet bore for sealing purposes.

2. Discussion

Pressure-reducing valves are used mainly in domestic and industrial water supplies, but they are also to be found in other useful fields and with other media. Also areas which convey ultra-pure media through pipeline systems use pressure-reducing valves, for example in micro-electronics, life-science industries, hospitals and research etc. They serve to reduce the higher pressure in the primary-side distributor network to an optimum pressure for the secondary-side outflow line whereby valve fittings and consumers in the outflow line are protected against pressures which are too high and the service life of the valve fittings can be increased as a result. The noise generated can moreover be reduced by installing a pressure-reducing valve in the outflow line, and the consumption of the medium can also be reduced, more particularly in the case of water supply networks.

DE 44 34 634 C2 discloses a pressure-reducing valve with which the adjustment of the desired output pressure can be easily managed. The medium which is flowing into the housing has a high, or too high, pressure for further use. The desired output pressure can be adjusted by the adjustment unit by suitably pretensioning the spring. This in turn produces the corresponding force on the poppet which regulates the output pressure. If the spring is compressed too strongly then it generates a high counter force on the poppet whereby the desired output pressure is high. The poppet, or its sealing seat which is located between the valve element and the ring-shaped projection of the housing, only closes when the pressure building up in the valve or in the poppet chamber is so great that it exceeds the permissible output pressure, whereby the poppet is pressed against the spring force and the valve element closes the valve seat. The poppet and the valve element with rod consist of several individual parts, furthermore sealing elements are disposed thereon which guarantee the sealing tightness and which are likewise formed as separate parts.

A pressure-reducing valve of this kind is not suitable for use in ultra-pure media since the numerous individual parts increase the risk of contamination. Sealing elements of elastomers, as are conventionally used, are furthermore not permissible for use with ultra-pure media since they cause undesired abrasion which would contaminate the purest medium.

SUMMARY OF THE INVENTION

It is an aspect of the invention to propose a pressure-reducing valve which is suitable for use for ultra-pure media and thus cannot cause abrasion of the sealing elements. Places are moreover to be avoided where contamination could easily occur and unnecessary edges and connection sites of individual parts should be reduced to a minimum in the area through which the medium flows. A complete emptying must furthermore be guaranteed so that no residual medium remains at inaccessible places, such as by way of example in blind hole bores or rear-cut sections in the event of complete emptying.

This is achieved according to the preferred embodiment of the invention in that the poppet is designed in one piece and the sealing element is arranged integrally in a monolithic and homogeneous manner on the poppet or integrally on the interior housing. By monolithic and homogeneous it is meant that the sealing element is formed as a solid, unbroken piece with the poppet or interior housing.

The integral arrangement of the sealing element has the advantage that since the sealing element and the poppet or the interior housing are in one piece there are no unnecessary transitions between individual parts which are connected to one another. Cracks and inaccessible surfaces etc. can thereby be avoided and thus the contamination of parts, particularly at inaccessible places, as known in valves of the prior art, can thus be sharply reduced. The seal is produced directly between the poppet or through the integral sealing element on the poppet and the shell surface of the poppet bore of the interior housing or, in the reverse case, between the sealing element disposed integrally on the interior housing, and the outside surface of the poppet. Thus a separate sealing element such as by way of example an O-ring can be omitted, both in the poppet and also in the poppet bore or on the interior housing. The poppet is disposed in the poppet bore as well as the intermediate sealing element for sealing the system. The sealing element can, as previously mentioned, be disposed integrally on the poppet or integrally on the interior housing in the poppet bore. FIG. 3 shows the sealing element 14a integrally on the interior housing 5a instead of poppet 13a.

The poppet is connected to the diaphragm by means of a fastening means. If the output pressure now rises above the value preset by means of the pressure adjustment unit, the medium flowing through the bypass bores disposed in the interior housing presses the diaphragm up against the spring force of the pressure adjustment unit, whereby the poppet is likewise entrained upward in the poppet bore. The integral sealing element of the poppet or the interior housing seals the medium flowing through against the shell surface of the poppet bore or against the outside surface of the poppet preferably above the through-flow openings. As soon as the output pressure is reduced as a result of the closed valve and consequently the pressure decreases underneath the diaphragm, the poppet drops and opens the valve seat which is formed by the sealing edge of the interior housing. The sealing element which is arranged integrally, is preferably formed as a sealing lip. Through the configuration of a sealing lip no great resistance is produced regarding the displacement of the poppet in the poppet bore, which enables the poppet to move easily in the poppet bore without applying any great force whereby a low hysteresis can be effected. This means that in the case of the valve according to the invention the effective output pressure lies close to the preset output pressure, since the sealing element or sealing lip as well as the material from which the poppet is made allow the friction or resistance to be low, which is a great advantage.

Alternatively there is the possibility that the interior housing slides along the poppet. Instead of the poppet the interior housing rises and falls along the stationary poppet, whereby the valve is opened or closed accordingly.

The sealing element or the sealing lip is preferably pressure-assisted. The medium which is flowing through the through-flow openings up to the sealing element or sealing lip acts on the same, which assists the sealing tightness between the poppet and poppet bore of the interior housing.

In order to increase the functional reliability of the valve and to determine and regulate the pressures which occur as far as possible without errors, it is necessary that the poppet in the poppet bore produces the smallest possible sliding resistance. This is achieved in that the poppet is made from a material which has a high sliding capacity or a low friction resistance and thus a low friction coefficient is present between the poppet and poppet bore. The poppet is preferably made from at least one of the materials PTFE, PFA, PVDF and/or TFM, or from a material which has at least one additive of the aforesaid materials. The poppet can be made from one of the materials and also material combinations. Mixtures or compounds are likewise suitable for manufacturing the poppet. Alternatively the poppet can include a further material as reinforcement.

The sealing cone on the poppet serves to restrict the pressure of the medium or to close the valve, as a result of a determined output pressure which lies above the pre-defined output pressure. When the valve is closed, as a result of the output pressure being too high, the poppet, as a result of the pressure which is acting on the diaphragm, is drawn up high and the sealing cone adjoins the valve seat of the interior housing wherein the valve seat is formed by the sealing edge. The medium is thereby unable to flow through the valve. The sealing cone is preferably arranged integrally on the poppet. However embodiments can also be provided wherein the sealing cone is designed as a separate part and can be fixed on the poppet wherein the useful field of this valve would then possibly be restricted.

The pressure adjustment unit serves for adjusting the output pressure. The spring is tensioned or relaxed correspondingly to the desired output pressure and is compressed or pretensioned more or less by means of the spring holder. If the adjustable pressure is not sufficient as a result of one spring, then a second spring can be disposed in the pressure adjustment unit. So that the size of the pressure-reducing valve does not change and the pressure-reducing valve is as compact as possible, the springs are arranged one inside the other. This means that two springs are used which have different spring diameters so that they can be disposed one inside the other. Through the possibility of arranging two springs in the valve the valve gains a larger adjustment range for the output pressure since on the one hand each of the springs can be used individually, and on the other hand both springs can be used together.

BRIEF DESCRIPTION OF THE DRAWINGS

An embodiment of the invention will now be described with reference to the drawings wherein the invention is not restricted to only this embodiment. The drawings show.

DETAILED DESCRIPTION OF THE PREFERRED EMBODIMENTS

Example embodiments will now be described more fully with reference to the accompanying drawings.

Figure 1:
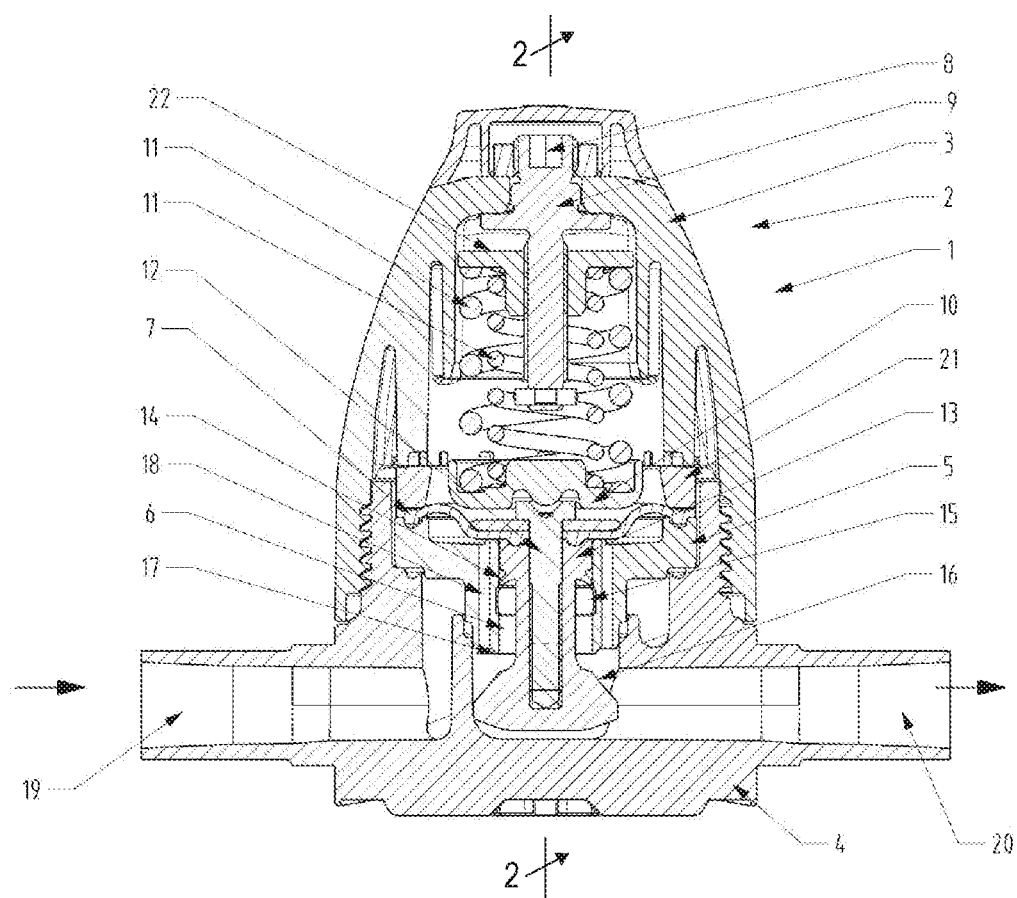
FIG. 1 is a longitudinal sectional view through a pressure-reducing valve according to the invention in the opened position.

FIG. 1 shows a pressure-reducing valve 1 according to the invention. The housing 2 is preferably formed from an upper part 3 and a lower part 4. An interior housing 5 is disposed in the housing 2. By screwing together the housing upper part 3 and the housing lower part 4 a diaphragm 7 is firmly clamped between the interior housing 5 and the retaining ring and divides the valve 1 into a medium-free and a medium-flowing or medium-containing area. Other methods of constructing a pressure-reducing valve are also possible, by way of example those wherein the two housing parts are connected together by means of separate fastening means or those where no further spacing is required. The interior housing 5 has through-flow openings 15 through which the medium flowing through the inflow pipe 19 then flows through and when the valve is open flows further through the lower area of the poppet bore 6 past the valve seat 17 towards the outlet pipe 20.

The poppet 13 is pressed down or opened correspondingly by the springs 11 of the pressure adjustment unit 8. The corresponding spring force which acts through the pretensioned springs 11 by means of the spring holder 22 on the spring plate 10 or fastening means 12 holds the valve 1 opened. The strength of the pretensioning of the springs 11 is obtained by the spindle 9 by means of which the springs 11 can be compressed to a desired length which produces the corresponding pretensioning force or spring force. There is also the possibility of providing only one spring 11 in the valve 1 which reduces the spring force whereby the adjustable output pressure lies in a lower area than when two springs 11 are installed and thereby have a higher spring force and thus permit a higher output pressure. The possibility of arranging the springs 11 in this way makes a wide tension width of the adjustable output pressure possible without changing the structural size of the valve.

Figure 2:
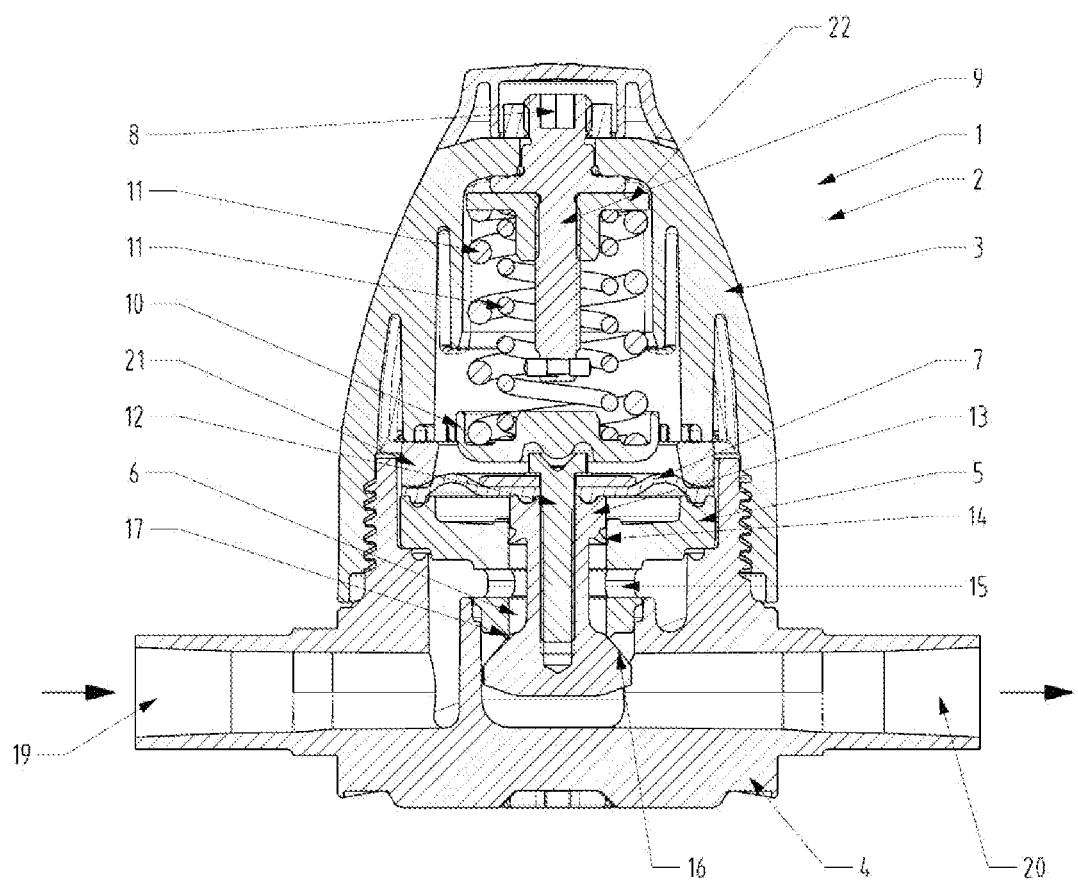
FIG. 2 is a longitudinal section taken along the lines 2-2 of FIG. 1 (normal to the section of FIG. 1) showing a pressure-reducing valve according to the invention in the closed position.
Figure 3:
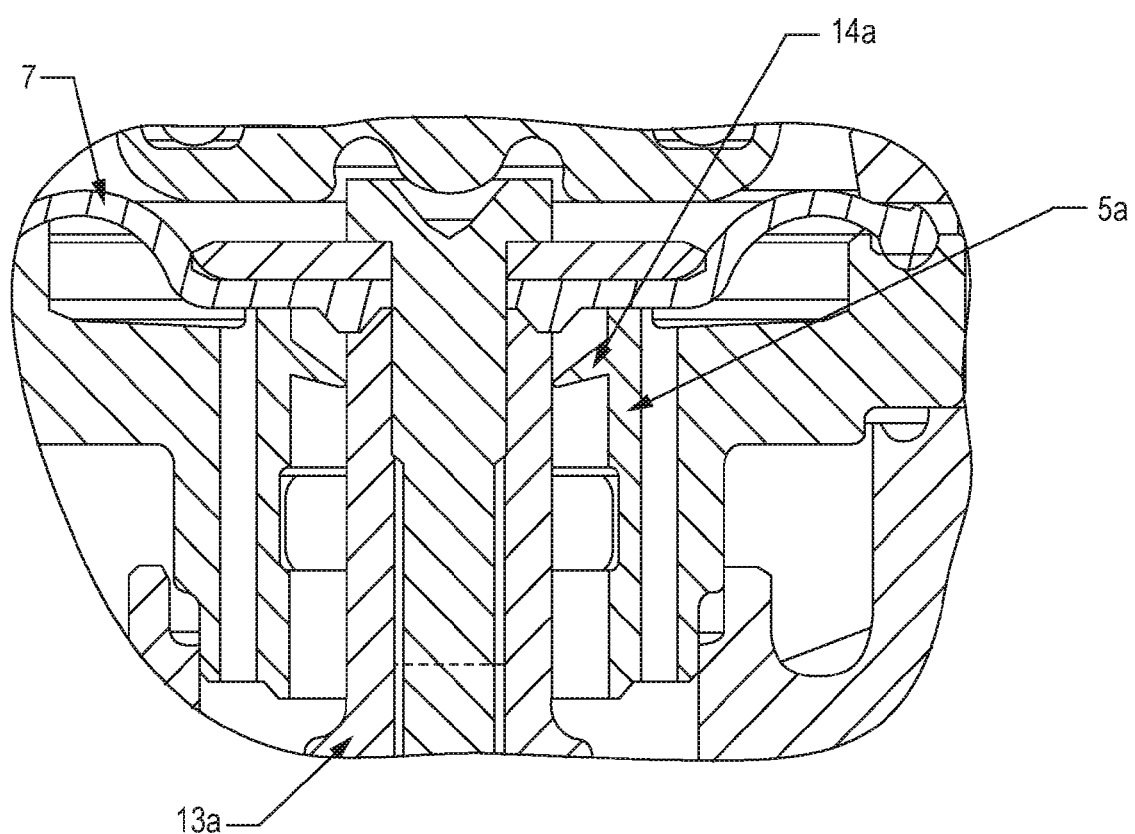
FIG. 3 is an enlarged partial longitudinal sectional view, similar to FIG. 1, but showing an alternative arrangement of the sealing element.

FIG. 2 shows the valve 1 in the closed position. The output pressure thus lies above the preset output pressure. The medium flows via the bypass bores 18 (shown in FIG. 1) which are arranged in the interior housing and through into the space underneath the diaphragm 7. The pressure which arises there presses against the spring force. As soon as the force through the medium underneath the diaphragm 7 is higher than the permissible output pressure or the adjusted spring force the springs 11 are further compressed together and the poppet 13 is drawn upwards in the poppet bore 6 through the diaphragm 7. The sealing element 14 which is arranged integrally on the poppet 13 seals off the poppet bore 6. The sealing element 14 is pressure-assisted by the medium flowing in through the through-flow openings 15. The sealing element 14 is designed as a sealing lip 14 whereby the smallest possible resistance occurs between the poppet 16 and poppet bore whilst the sealing tightness is nevertheless guaranteed. The valve seat 17 is closed through the raised poppet 13 since the sealing cone 16 of the poppet 13 seals off the valve seat 17. The poppet 13 is preferably made from a low-friction material whereby the valve 1 can react satisfactorily to the output pressure. If the output pressure drops below the preset value, then the pressure underneath the diaphragm 7 also drops. The poppet 13 drops correspondingly and the medium can again flow through the valve 1.

What is claimed is:

1. A pressure-reducing valve for fluid and gaseous media, comprising:
 a housing having at least one upper and lower part, an interior housing wherein the interior housing has a poppet bore, a diaphragm for dividing the housing into a fluid-free and fluid-flowing area, a pressure adjustment unit, wherein the pressure adjustment unit includes a spindle, a spring plate, a spring holder and at least one spring, a fastener and a poppet, wherein the poppet and the diaphragm are connected to one another by said fastener, wherein the poppet is disposed in the poppet bore and at least one sealing element is arranged between the poppet and poppet bore for sealing action, wherein the poppet and the sealing element are formed in one piece in a monolithic and homogeneous manner or the sealing element and interior housing are formed in one piece in a monolithic and homogeneous manner.

2. A pressure-reducing valve according to claim 1 wherein the poppet is arranged displaceably in the poppet bore.

3. A pressure-reducing valve according to claim 1 wherein the sealing element seals against an inner surface of the poppet bore.

4. A pressure-reducing valve according to claim 1 wherein the sealing element seals against the outside surface of the poppet.

5. A pressure-reducing valve according to claim 1 wherein the sealing element is pressure-assisted.

6. A pressure-reducing valve according to claim 1 wherein the sealing element has the form of a sealing lip.

7. A pressure-reducing valve according to claim 1 wherein the poppet is made from a material which has a high sliding capacity or a low friction resistance.

8. A pressure-reducing valve according to claim 1 wherein the poppet is made from PTFE, PFA, PVDF and/or TFM or from a material which has at least one addition of these materials.

9. A pressure-reducing valve according to claim 1 wherein the poppet has a sealing cone.

10. A pressure-reducing valve according to claim 9 wherein the sealing cone is disposed integrally on the poppet.

11. A pressure-reducing valve according to claim 1 wherein the pressure adjustment unit has at least two springs.

12. A pressure-reducing valve according to claim 11 wherein the springs are arranged one inside the other.

13. A pressure-reducing valve comprising:
 a housing;
 a diaphragm for dividing the housing into a fluid-free area and a fluid-flowing area;
 a poppet connected to the diaphragm and riding in a poppet bore having an inner wall:
 a sealing lip for sealing the poppet and inner wall of the poppet bore, said sealing lip extending from an outer surface of the poppet and slideably engaging the inner wall of the poppet bore or the sealing lip extending from the inner wall of the poppet bore and engaging the poppet; and
 the poppet and sealing lip being formed in one piece in a monolithic and homogeneous manner or the inner wall of the poppet bore and sealing lip being formed in one piece in a monolithic and homogeneous manner.

* * * * *